United States Patent [19]

Graf et al.

[11] 4,295,051

[45] Oct. 13, 1981

[54] OPTICAL CARD READER

[75] Inventors: Fredy E. Graf; William M. Mahler; Howard J. Malan, all of San Diego, Calif.

[73] Assignee: General Atomic Company, San Diego, Calif.

[21] Appl. No.: 40,571

[22] Filed: May 21, 1979

[51] Int. Cl.³ .............................................. G06K 7/10
[52] U.S. Cl. .................................. 250/569; 235/460
[58] Field of Search ............... 250/566, 568, 569, 570; 235/458, 459, 460, 461

[56] References Cited

U.S. PATENT DOCUMENTS

| | | | |
|---|---|---|---|
| 3,036,765 | 5/1969 | Jones et al. | 250/569 |
| 3,065,356 | 11/1969 | Blake et al. | 250/569 |
| 4,066,910 | 1/1978 | Swift | 250/569 |
| 4,136,820 | 1/1979 | Collado et al. | 235/460 |
| 4,176,783 | 12/1979 | Eppich | 235/458 |

Primary Examiner—David C. Nelms
Attorney, Agent, or Firm—Fitch, Even, Tabin, Flannery & Welsh

[57] ABSTRACT

An improved optical card reader is disclosed which is adapted for use with processing means for providing on-the-fly decoding of multibit data words from a card that is inserted therein. The card reader has two sets of light emitting means and two sets of light detecting means and the light detecting means are interconnected to provide a single set of outputs to comparators which measure the signal levels and provide distinct digital outputs. Selective energization of the light emitting means provides effective multiplexing of two multibit data words from a single set of outputs.

11 Claims, 4 Drawing Figures

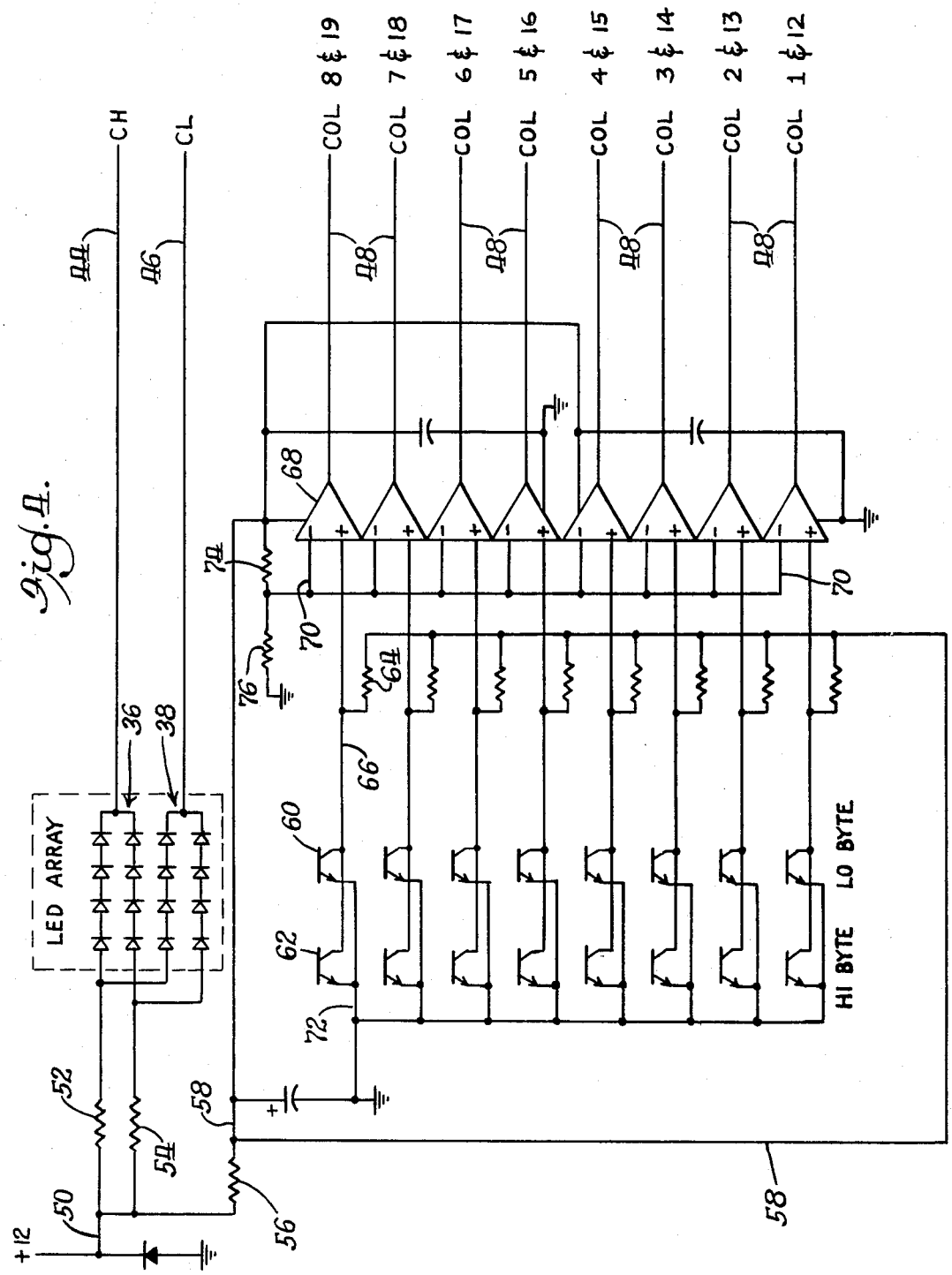

OPTICAL CARD READER

The present invention generally relates to optical card reading devices, and more particularly, to card reading devices that are adapted for on-the-fly reading.

Many card readers have been developed for various uses, including mechanical card readers that have switch fingers that are selectively switched by holes located in the surface of an inserted card, as well as optical card readers which generally have a light detecting circuit that cooperates with light emitting means for decoding transparent areas or holes in the card that is inserted therein. Mechanical card readers suffer from the problems of wear and dirt that make them particularly susceptible to failure, particularly when they are placed in an environment which experiences heavy use. Since many card readers are placed in a physical environment that may be subjected to the elements and in extremely cold or hot climates, it is highly desirable to have a card reader that reliably operates with a low incidence of down time and operating error. This is particularly true because card readers are often used for carrying out financial transactions for which reading or decoding errors can result in significant costs.

One use for card readers for which all of the above are important considerations is the dispensing of fuel in a truck loading or self serve facility that may be located in either an extremely hot or cold climate. If a card is used by customers of a gasoline terminal or station, particularly to truck drivers who load large amounts of fuel, it can be readily appreciated that decoding errors of any magnitude would not be tolerated by the terminal or station managers because significant losses would naturally result. While optical card readers have been developed, their cost has often been greater than the cost of mechanical card readers and many designs suffer from unreliable decoding of information. Moreover, many prior art designs have required individual adjustment of a large number of potentiometers which increases manufacturing costs. Other optical card readers have had excessive amounts of circuitry which contribute to increased costs as well as the likelihood of circuit failure due to circuit complexity.

Accordingly, it is an object of the present invention to provide an improved optical card reader which is extremely reliable in its operation and is relatively inexpensive to manufacture due to the relative simplicity of its design.

Yet another object of the present invention is to provide an improved optical card reader that is relatively inexpensive to manufacture, due in part to the capability of eliminating circuit components as a result of multiplexing digital output information.

Yet another object of the present invention is to provide an improved optical card reader which has a relatively simple mechanical construction that permits accurate alignment, is capable of easy disassembly for periodic cleaning and which is fabricated from a small number of structural components.

Other objects and advantages will become apparent upon reading the following detailed description while referring to the attached drawings, in which:

FIG. 4 is an electrical schematic diagram illustrating the circuit associated with the optical card reader embodying the present invention.

Broadly stated, the optical card reader of the present invention is quite compact in terms of overall size and design and has many desirable attributes that contribute to its exceedingly reliable operation and low maintenance. The construction is such that it can be easily disassembled for the purposes of periodic cleaning and its novel circuitry results in significantly fewer circuit components. The circuitry multiplexes two sets of data words onto a single set of output lines that are operably connected to processing means such as a microprocessor or the like which receives the decoded data from the card that is being read. Moreover, the circuit design can be easily fabricated and does not require adjustment of potentiometers or the like in the circuit to achieve proper operation, as is the case with some prior art designs.

Figure 1:
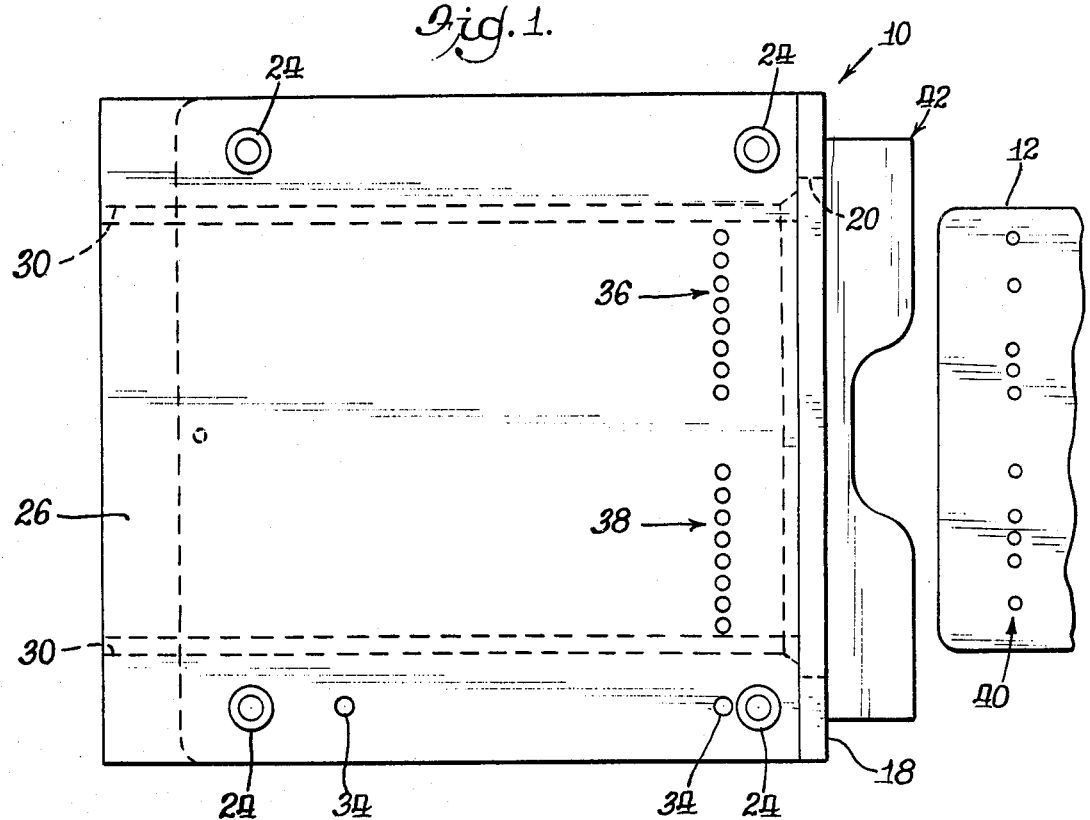
FIG. 1 is a top plan view of the optical card reader embodying the present invention and is shown without specific circuit components for the sake of clarity.
Figure 3:
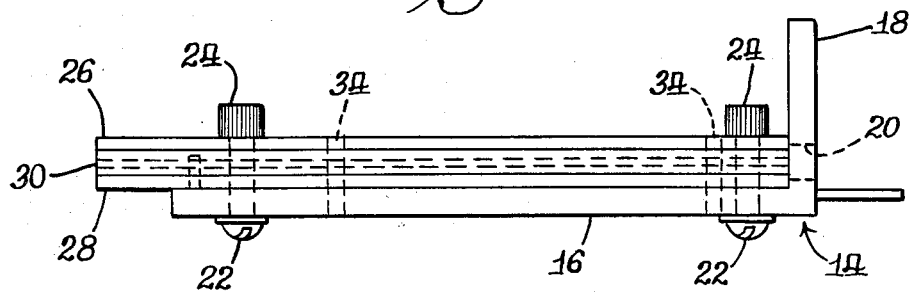
FIG. 3 is a side view of the optical card reader shown in FIG. 1.
Figure 2:
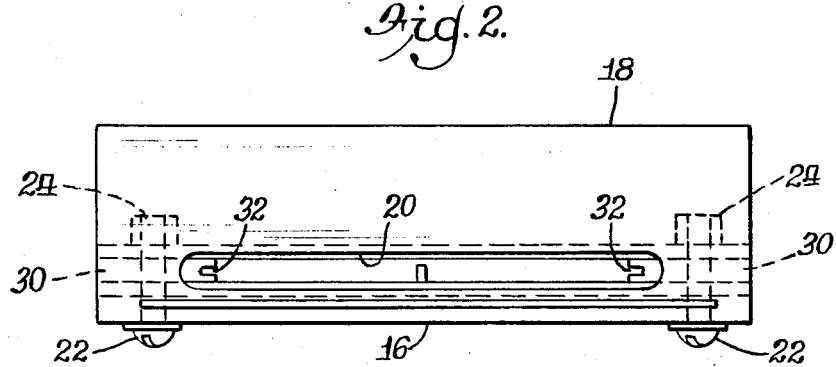
FIG. 2 is a front view of the optical card reader shown in FIG. 1.

Turning now to the drawings, and particularly FIGS. 1-3, the optical card reader, indicated generally at 10, is shown together with a card 12 that is positioned adjacent the opening of the card reader. It should be appreciated that the card reader will be attached to other equipment, for example, such as an enclosure or the like which has a source of power for operating the reader, as well as adequate communication lines for transmitting the data to the processing means that is read from the card and for receiving appropriate control signals that are necessary for the proper operation of the card reader.

In terms of physical construction, the card reader has a frame member, indicated generally at 14, which comprises a generally flat rectangularly shaped plate 16 with an integrally formed transverse front plate 18 which contains an elongated opening 20 through which the card 12 may be inserted. The flat plate 16 of the frame 14 provides a mounting surface to which the other components of the optical reader can be attached. Referring particularly to FIGS. 2 and 3, it is seen that the other components of the reader are grouped in a sandwich type construction in a manner whereby dimensional accuracy and alignment can be achieved and are mounted to the base plate 16 by a number of screws 22, each of which has an associated knurled nut 24. The sandwich construction includes an upper printed circuit board 26, a lower printed circuit board 28 and a pair of side rails or members 30 which are spaced apart from one another and which have slotted recesses 32 in facing relation, with the width of the slots being slightly greater than the thickness of the card 12 to receive the same in sliding relation. The side rails 30 are spaced from one another so that the opposite sides of the card 12 will be inserted in one of the slotted recesses and provide a guide during the insertion of the card therein.

In this regard, while the side rails should be spaced so that the card can be easily inserted without undue friction, there should not be a significant amount of movement of the card in the vertical direction as shown in FIG. 1 or decoding errors could result due to misalignment of the appropriate openings in the card relative to the optical reading means. To properly adjust the relative position of the lower side rail 30 and the two printed circuit boards 26, 28 to one another, it is preferred that the lower side rail, as shown in FIG. 1, be provided with a pair of pins 34 which provide a permanent positioning means for the lower side rail with respect to the printed circuit boards. The upper side rail is merely held in place by the two screws 22 and threaded holes and preferably has a slightly enlarged corresponding aperture in the flat plate 16 through which the screw passes to permit adjustment of the location of the upper rail and therefore the spacing between the two side rails. The spacing between the two side rails is determined by means of a precision width gauge and need only be done at time of assembly.

While the optical reading means are not shown in detail in FIGS. 1–3, two sets of light emitting diodes 36 and 38 are shown in FIG. 1 for the purpose of providing an indication of the location thereof relative to the entrance of the optical reader. As is evident from the drawings, there are eight light emitting diodes in each set and while it is not shown in FIG. 1, a corresponding number of phototransistors are located opposite the light emitting diodes and are provided in the lower printed circuit board 28 directly opposite their associated light emitting diodes of the printed circuit board 26. As will be explained in more detail hereinafter, when a card 12 is inserted in the slot, several rows of openings, such as the single row shown at 40 in FIG. 1, will pass the light emitting diode-phototransistor combinations and the information will be decoded from the card and forwarded to the processing means. A transverse extension 42 from the front face 18 provides a guide for the hand of one who is inserting the card into the card reader.

In accordance with an important aspect of the present invention and referring to FIG. 4, the electrical schematic circuit diagram for the card reader is illustrated and has a pair of input lines 44 and 46 upon which command strobe pulses from the processing means are applied and a number of output lines 48 on which the digital output data is applied for forwarding to the processing means during operation. A source of positive voltage, preferably about 12 volts, is applied on line 50 which powers the circuitry, including the sets of light emitting diodes 36 and 38 via resistors 52 and 54 as well as comparators and the phototransistors via resistor 56 and line 58. There are a total of 16 phototransistors, including typical phototransistors 60 and 62. The positive voltage on line 58 is applied through a resistor 64 to a line 66 that extends to the collector of both phototransistors 60 and 62 as well as to the positive input of a typical comparator 68 which has a second input supplied by line 70 and an output line 48. The emitters of transistors 60 and 62 are connected together to ground via line 72 that extends to the emitters of all other phototransistors in both sets thereof. The lines 58 and 70 are connected to a resistor 74 and line 70 is also connected to ground through resistor 76. The resistors 74 and 76 provide a voltage divider and effectively provide a threshold voltage of preferably about 2 volts on line 70 which provides one input of each of the comparators. When the voltage on line 66 exceeds the level of about 2 volts, the output line 48 is at a high level and when the input line 66 drops below about 2 volts, then the output of the comparator 68 will also go low as is desired. It should be appreciated that if both phototransistors 60 or 62 are in a nonconducting state which will occur if no light is being detected, then the voltage on line 66 will be at a level of about 12 volts and the comparator 68 will have a high output. However, in the event that either of the phototransistors 60 or 62 is placed into conduction, then the voltage on line 66 will drop to a level approaching zero, but certainly less than the threshold voltage of approximately 2 volts on line 70, and will result in the comparator having an active, low output. It should be appreciated that by connecting the pairs of phototransistors as shown, a common signal path is provided on line 66 and enables the data from either phototransistor 60 or 62 to be effectively provided on the output line 48. In this manner, only a single comparator 68 is needed for two data bits, it being understood that the two phototransistors 60 and 62 are associated with different data words. In this regard, the rightward vertical row or phototransistors are associated with the set of light emitting diodes 38 while the leftward vertical row is associated with the set of light emitting diodes 36. The data is effectively multiplexed onto the output lines 48 by the selective control signals that are applied to the lines 44 and 46. If line 44 is strobed to a low state, then current will flow through the set of light emitting diodes 36 which can be detected by the leftward row of phototransistors. When control line 46 is strobed low, the set of light emitting diodes 36 will be placed into operation and light emitted from them can be detected by the rightward set of phototransistors. During operation, the processing means will only cause one of the lines 44 or 46 to be strobed low at any one time and this results in multiplexing of two eight bit data words onto the single set of eight output lines 48. Even during normally fast insertion of a card 12 into the slot, each row of openings 40 in the card will be present under the phototransistors for approximately 50 milliseconds and the circuitry operates with sufficient speed that only about 600 microseconds is required to read or decode a single row of data. Thus, when the card is being inserted, the processing means can alternately strobe the lines 44 and 46 and have two eight bit data words transmitted on the output lines 48 to be further stored or otherwise processed by the processing means. An advantage of the use of only eight comparators relative to sixteen and the energization of only eight light emitting diodes at a time is that the power requirements are reduced approximately 50 percent. The use of the comparators eliminates the necessity for individual potentiometers that must be adjusted.

From the foregoing description, it should be readily appreciated that an improved optical card reader has been shown and described which has many desirable features. The relatively small number of circuit components coupled with the relatively simple physical construction greatly contribute to the economical fabrication and superior reliability in terms of decoding accuracy and minimum down time. The card reader can be easily disassembled for the purpose of removing dirt from the area in which the card is inserted without losing any of its mechanical alignment. The multiplexing of the two data words results in fewer electrical components in addition to lesser power requirements.

It should be understood that although certain preferred embodiments of the invention have been illustrated and described, various modifications thereof will become apparent to those skilled in the art and accordingly, the scope of the present invention should be defined only by the appended claims and equivalents thereof.

Various features of the invention are set forth in the following claims.

What is claimed is:

1. An on-the-fly optical card reader for use with processing means for decoding multibit data words from a card as it is inserted therein and providing digital output signals corresponding to the data words encoded on the card, comprising:

frame means for supporting components of the reader and for mounting said reader;

guide means associated with the frame means for slidingly receiving and positioning the card to be decoded;

means for optically reading one row having at least two of said multibit digital encoded data words from said cards, said reading means being adapted to sequentially read each row of said data words as said card is inserted in said reader, said reading means being adapted to read at least two data words per row with the bits of each data word being adjacent one another and said words being separate from one another at specific locations along said row, said reading means generating digital signals corresponding to said data words and providing the digital signals of a complete one of the two or more data words at the output of said card reader in response to a control signal identifying a single data word location being selectively applied thereto.

2. An optical card reader as defined in claim 1 wherein said reading means comprises first and second sets of light emitting means and light detecting means for reading two data words, each of the light detecting means of the first set being operably connected to a corresponding light detecting means of the second set so as to provide a common signal path from corresponding pairs of light detecting means, each signal path being connected to means for providing digital output signals in response to the operation of either of said light detecting means, each set of light emitting means and light detecting means being in separate specific locations to enable reading of separate data words.

3. An optical card reader as defined in claim 2 wherein said light emitting means comprises light emitting diodes which are adapted to be actuated in response to an active control signal being applied thereto.

4. An optical card reader as defined in claim 2 wherein each of said light detecting means comprises a phototransistor, the emitters of the corresponding pair of phototransistors being connected to ground and the collectors thereof being connected together and to said common signal path so that light detected thereby places said phototransistors into conduction and provides a change in voltage level on the common signal path.

5. An optical card reader as defined in claim 4 wherein said digital output providing means comprises comparator means having a predetermined threshold value applied to one input thereof and said common signal path applied to the other input thereof, said comparator means providing one voltage level when said voltage level on said common signal path exceeds said threshold value and a second output level when the common signal path voltage level is below said threshold value.

6. An optical card reader as defined in claim 2 wherein said frame means comprises a generally flat plate with an integrally formed front plate means member, said front plate member having an elongated opening through which said card can be inserted, said flat plate means providing a surface to which other components can be attached.

7. An optical card reader as defined in claim 6 wherein said guide means comprises a pair of elongated side members, each of said side members having an elongated slot facing the other and adapted to receive and guide a card that is inserted in the slot of said frame means, each of said side members being attached to said frame means with removable attachment means that permit disassembly for the purpose of cleaning and maintenance, one of said side members being provided with means for positioning the same in a permanent predetermined position relative to said frame means when said guide means is assembled, the other one of said side members being adjustably attached so as to permit accurate alignment of said card relative to said optical reading means.

8. An optical card reader as defined in claim 7 wherein said optical reading means comprises printed circuit boards and circuit elements that are located on opposite sides of said side members and are attached to said guide members and said frame means.

9. An optical card reader as defined in claim 8 wherein said light emitting means are located near the opening in a line generally parallel with the front of said card reader and generally perpendicular to said side members and said light detecting means are connected to the other printed circuit board opposite said corresponding light emitting means.

10. An optical card reader as defined in claim 9 wherein each of said sets of light emitting means and light detecting means comprises eight light emitting means and eight light detecting means.

11. An on-the-fly optical card reader for use with processing means for decoding multibit data words from a card as it is inserted therein and providing digital output signals corresponding to the data words encoded on the card, comprising:

frame means comprising a generally flat plate means with a transverse front plate member attached thereto, said front plate member having an elongated opening through which the card can be inserted, the flat plate means providing a surface of attachment for other components;

guide means operably attached to said frame means and comprising a pair of elongated side members each having an elongated slot facing the other and adapted to receive and guide a card that is inserted in the slot of said frame means, each of the side members being attached to said frame means with removable attachment means that permit disassembly of said side members from said frame means for the purpose of cleaning and/or maintenance;

means for optically reading one row having at least two of said multibit digital data words from said cards, said reading means being principally contained on printed circuit boards that are located on opposite sides of said guide means and being connected to said frame means by said removable attachment means, said reading means being adapted to sequentially read each row of said data words as said card is inserted in said elongated opening, said reading means being adapted to read at least two data words per row, the bits of each data word being adjacent one another and said words being separate from one another and at specific locations along said row, said reading means generating digital signals corresponding to said data words and providing the digital signals of a complete one of the two or more data words at the output of said card reader in response to a control signal identifying a single data word location being selectively applied thereto.

* * * * *